United States Patent
Teetzel et al.

(10) Patent No.: US 9,674,676 B2
(45) Date of Patent: Jun. 6, 2017

(54) PUSH TO TALK SYSTEM WITH WIRELESS INTERFACE

(71) Applicant: Wilcox Industries Corp., Newington, NH (US)

(72) Inventors: James W. Teetzel, Portsmouth, NH (US); Travis S. Mitchell, Dover, NH (US)

(73) Assignee: Wilcox Industries Corp., Newington, NH (US)

( * ) Notice: Subject to any disclaimer, the term of this patent is extended or adjusted under 35 U.S.C. 154(b) by 19 days.

(21) Appl. No.: 14/601,815

(22) Filed: Jan. 21, 2015

(65) Prior Publication Data

US 2015/0215749 A1  Jul. 30, 2015

Related U.S. Application Data

(60) Provisional application No. 61/933,612, filed on Jan. 30, 2014.

(51) Int. Cl.
*H04W 4/10*  (2009.01)

(52) U.S. Cl.
CPC ..................... *H04W 4/10* (2013.01)

(58) Field of Classification Search
CPC .................................................. H04W 4/10
See application file for complete search history.

(56) References Cited

U.S. PATENT DOCUMENTS

| | | | | |
|---|---|---|---|---|
| 8,606,572 B2 * | 12/2013 | Zhu | ..................... | G10L 21/0208 704/233 |
| 8,665,760 B2 * | 3/2014 | Sinivaara | .............. | H04L 45/308 370/227 |
| 2006/0252457 A1 * | 11/2006 | Schrager | ............. | H04M 1/6066 455/556.1 |
| 2006/0286933 A1 * | 12/2006 | Harkins | ................... | A42B 3/30 455/41.2 |
| 2008/0085679 A1 * | 4/2008 | Fettig | ....................... | H04B 5/06 455/41.2 |
| 2010/0039229 A1 * | 2/2010 | Westerlund | ............ | A62B 18/08 340/10.1 |
| 2015/0080061 A1 * | 3/2015 | Dieringer | ............ | H04M 1/6066 455/569.1 |

* cited by examiner

*Primary Examiner* — Bobbak Safaipour
(74) *Attorney, Agent, or Firm* — McLane Middleton, Professional Association

(57) ABSTRACT

A communication system includes a headset including a microphone and an audio speaker installed on the headset, the headset including an RF transceiver configured to perform wireless communication with a two-way radio having a push-to-talk communication channel. The RF transceiver is further configured to perform wireless communication with an information handling system. The headset includes processing electronics configured to process an input signal from the microphone and output a first processed signal to the RF transceiver and to process an input signal from the RF transceiver and output a second processed signal to the speaker. A remote control unit is configured to perform wireless communication with the headset, the remote control unit including a remote control unit interface disposed thereon for selectively configuring the headset to function as an audio interface for the push-to-talk communication channel and an audio interface for the information handling system.

17 Claims, 10 Drawing Sheets

Hybrid Life Support
Voice Prompts/Commands

Voice Prompts

- Low Air Pressure Warning
- Low Battery Warning
- Warning from Air Quality Monitor
- Mode Selection Read Out
- Current Air Pressure Voice Commands

- Mode Selection
  - SCBA
  - PAPR
  - APR
- Send Data
  - GPS Location
  - Vital Signs
- Receive/Display Data
  - Team Member Vitals/GPS Position
- Current Air Pressure

FIG. 4

Weapon System
Voice Prompts/Commands

Voice Prompts
- Range to Target
- Current GPS Location
- GPS Location of Team Member
- Current Mode Selection
- Low Battery Voice Commands
- Range Target
- Mode Selection
- Send current GPS Location To Team/ Home Base
- Send Range to Target

FIG. 8

PUSH TO TALK SYSTEM WITH WIRELESS INTERFACE

CROSS REFERENCE TO RELATED APPLICATION

This application claims the benefit of provisional application No. 61/933,612 filed Jan. 30, 2014. The aforementioned provisional application is incorporated herein by reference in its entirety.

BACKGROUND

The present invention relates to a communication system and, in particular, to a communications interface for a commercial, off-the-shelf two-way radio and an information handling system such as a life support system, weapon video display, laser range finder, or the like.

SUMMARY

In one aspect, a communication system includes a headset including a microphone and an audio speaker installed on the headset, the headset including an RF transceiver configured to perform wireless communication with a two-way radio having a push-to-talk communication channel. The RF transceiver is further configured to perform wireless communication with an information handling system. The headset includes processing electronics configured to process an input signal from the microphone and output a first processed signal to the RF transceiver and to process an input signal from the RF transceiver and output a second processed signal to the speaker. A remote control unit is configured to perform wireless communication with the headset, the remote control unit including a remote control unit interface disposed thereon. The remote control unit selectively configures the headset to function as an audio interface for the push-to-talk communication channel and an audio and/or data interface for the information handling system.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIG. 4 illustrates some of the exemplary voice commands for controlling the life support system via the push-to-talk system herein and audible alerts or prompts output by the push-to-talk system.

FIG. 8 illustrates some of the exemplary voice commands for controlling the weapon system via the push-to-talk system herein and audible alerts or prompts output by the push-to-talk system.

DETAILED DESCRIPTION OF THE PREFERRED EMBODIMENTS

Figure 1:
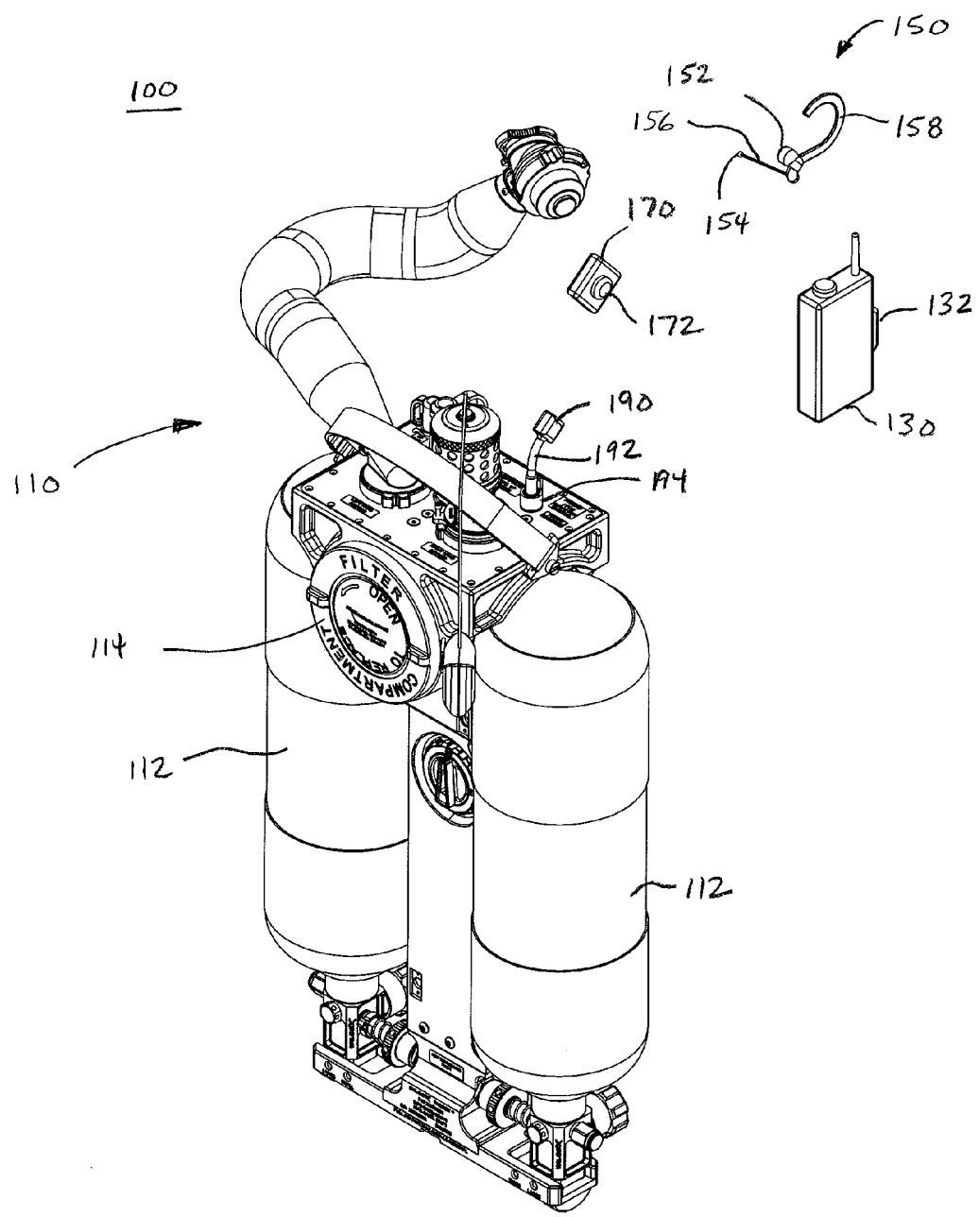
FIGS. 1 and 2 are partially exploded views illustrating an exemplary push-to-talk (PTT) system used in connection with a life support system.
Figure 2:
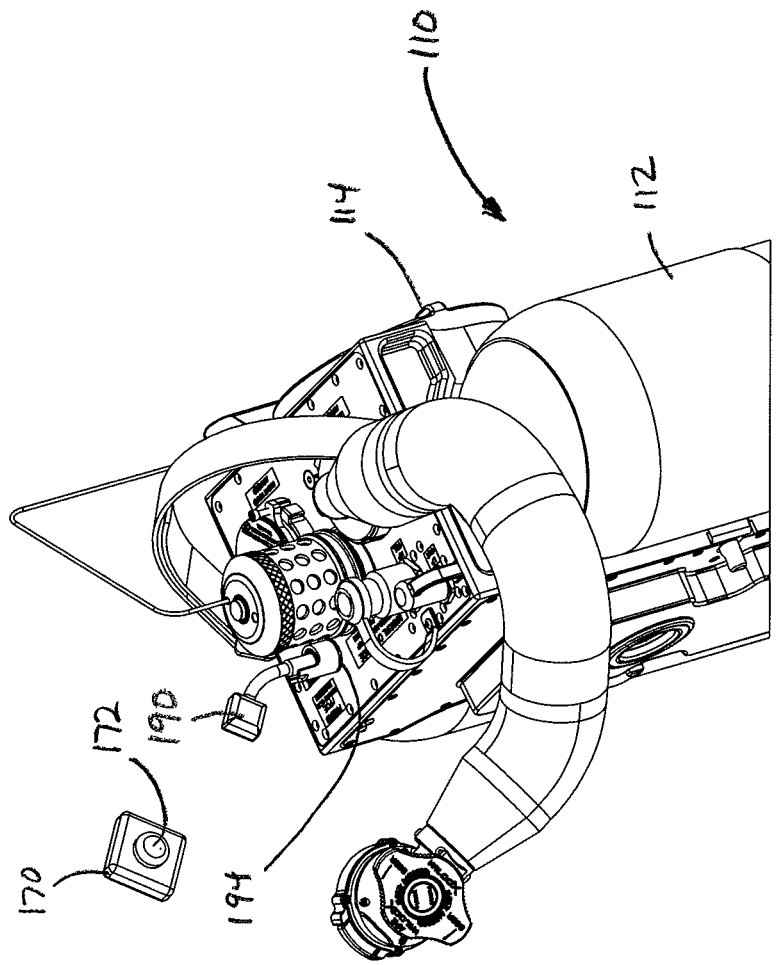
Figure 2:
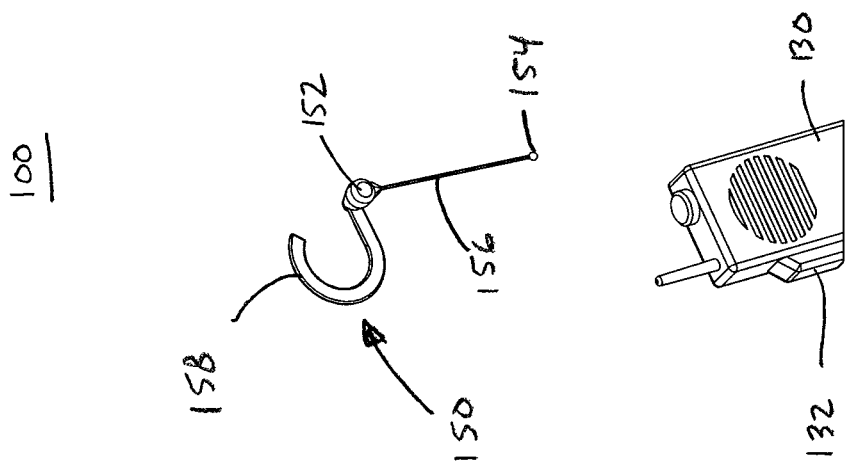
Figure 3:
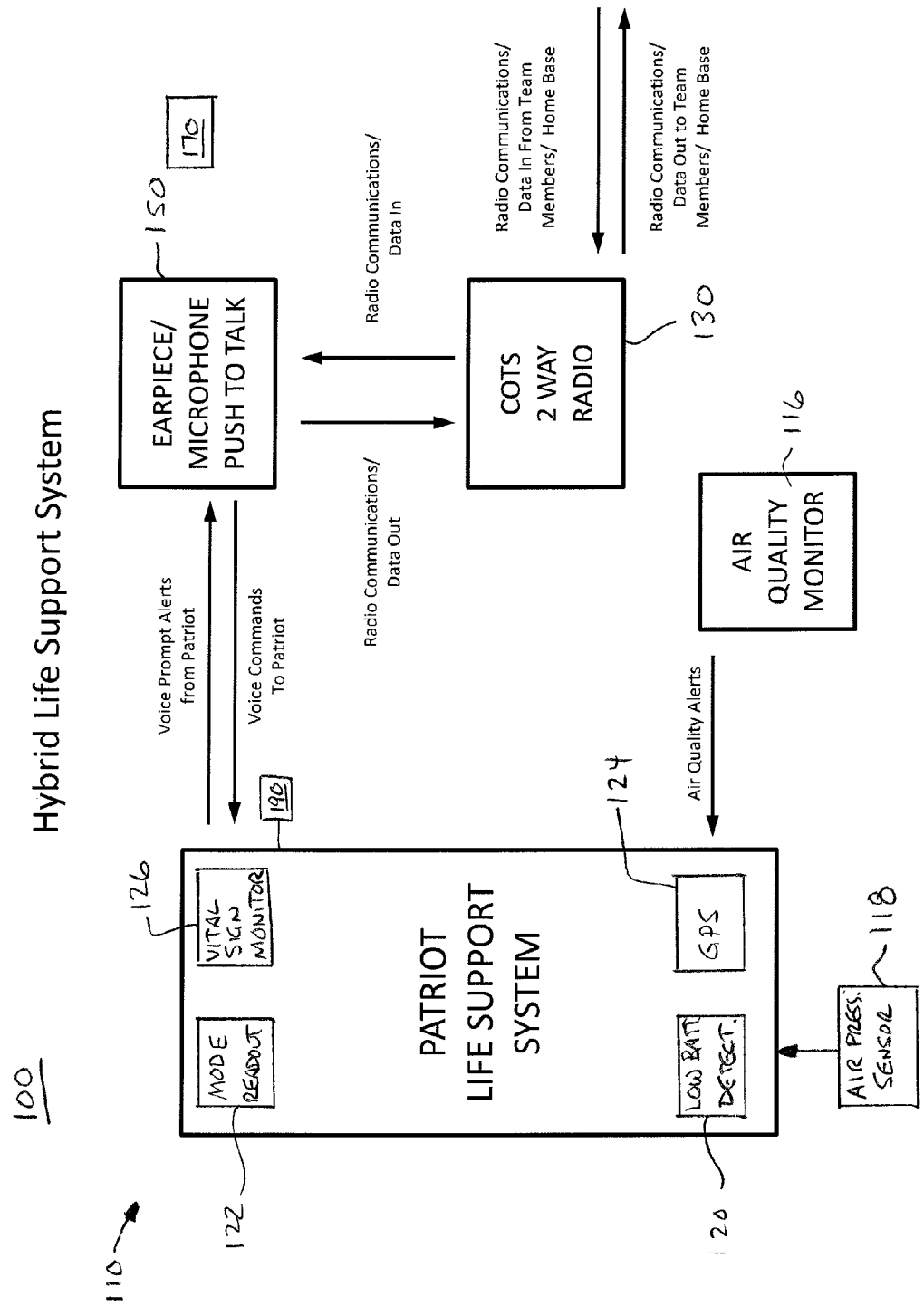
FIG. 3 is a functional block diagram of the system appearing in FIGS. 1 and 2.
Figure 5:
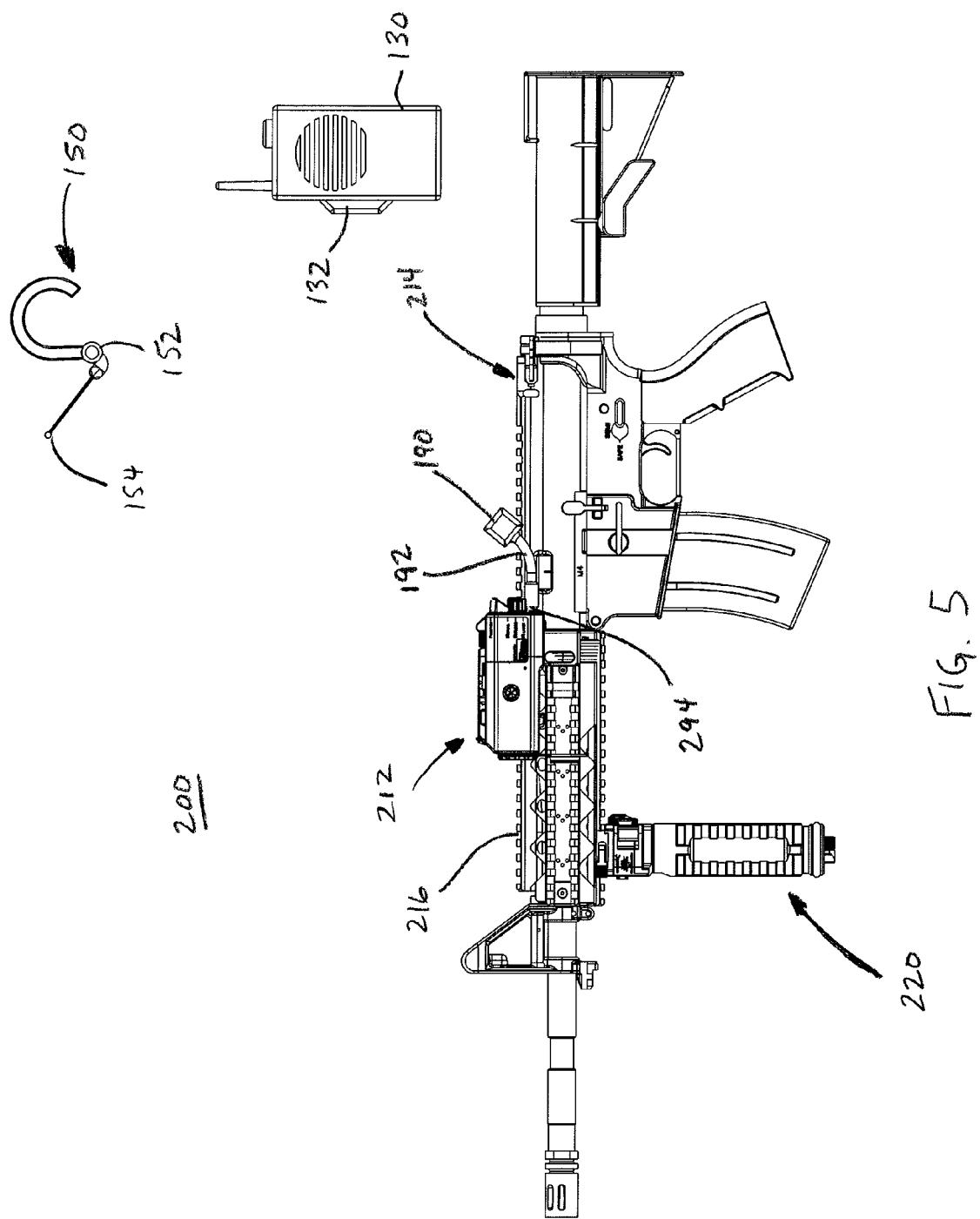
FIGS. 5 and 6 are partially exploded views illustrating an exemplary push-to-talk system used in connection with a weapon system such as a weapon laser system.
Figure 6:
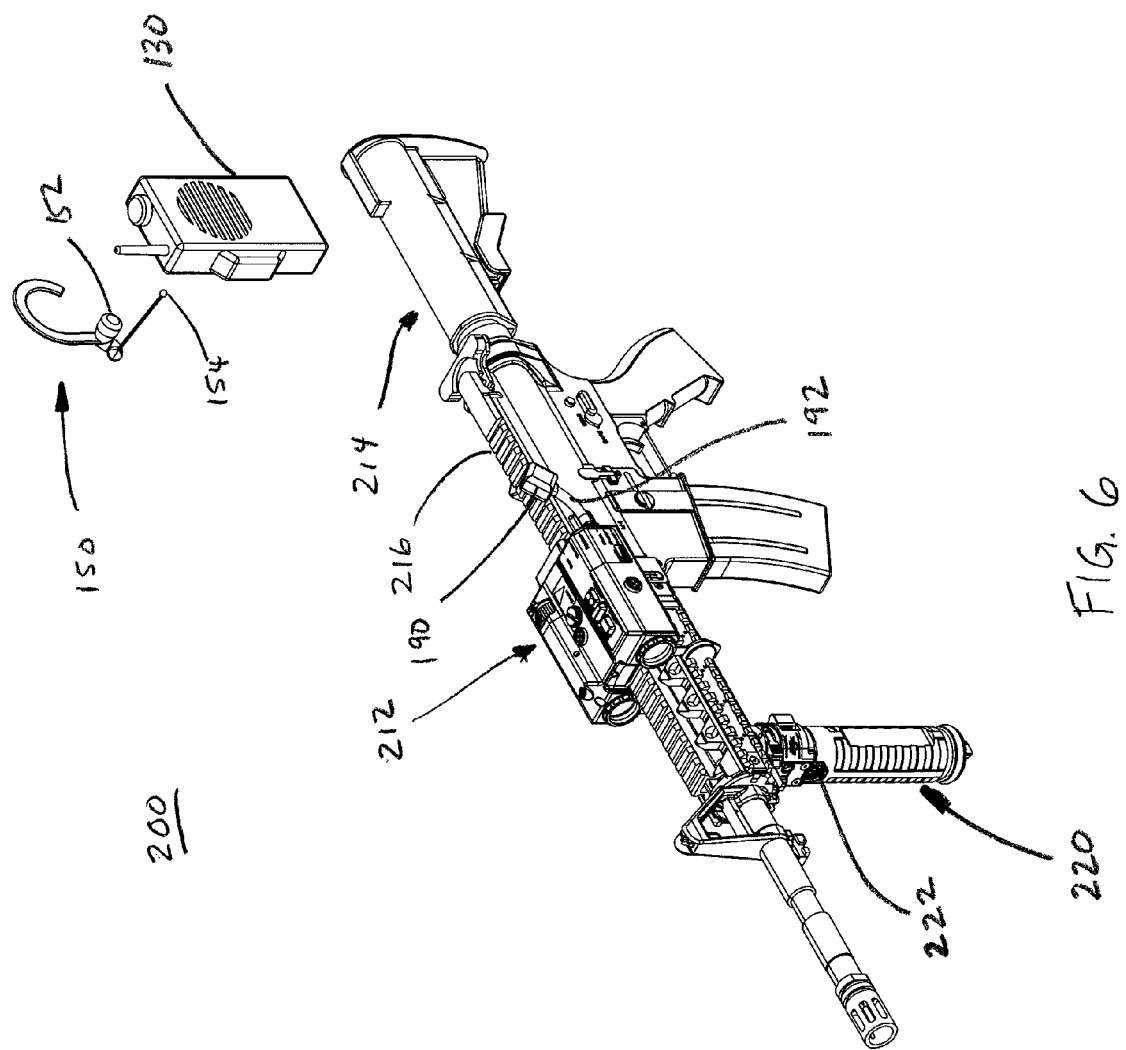

Referring now to the drawings, there appears exemplary push-to-talk system which provides an interface between a two-way radio and a remote, user controlled computer- or processor-based information handling system. Referring to FIGS. 1-4, there appears a first exemplary communication system 100, wherein the information handling system is a life support system 110. The life support system 110 may be a hybrid breathing system which is selectively operable in a self-contained breathing system (SCBA) mode in which breathable air/gas is provided by a self-contained air supply 112 such one or more air tanks or cylinders, a powered air-purifying respirator (PAPR) mode of operation, in which filtered ambient air is drawn with blower assistance through one or more air filters or purifiers 114 and delivered to the user, and a non-powered air-purifying respirator (APR) mode of operation, in which in which the air is drawn through the air purifying via the user's negative inhalation pressure. The life support system 110 may be as described in commonly owned U.S. Pat. No. 7,647,927, which is incorporated herein by reference in its entirety.

The life support system includes an air quality monitor 116 which samples the ambient air to detect toxic or unfilterable constituents in the ambient environment. The air quality monitor 116 may be integral with the system 110 or remote therefrom and in communication with the life support system 110 via a wired or wireless link. An air pressure sensor 118 is provided to sense the pressure level present in the tanks 112. A low battery detection circuit 120, which may be for example a circuit for monitoring the voltage level of a power supply which provides electrical power for operation of the life support system. A SCBA/PAPR mode readout sensor 122, such as a switch, position indicator, etc., is provided to determine the current operating mode of the life support system 110. A GPS receiver 124 may be provided to detect positional information of the user. A vital sign monitoring system 126 is provided to sense one or more vital signs of the wearer, such as heart rate, body temperature, respiratory rate, and so forth.

The communication system 100 includes a two-way radio 130, which may be a portable, e.g., handheld, two-way radio. The two-way radio 130 may be a commercial off-the-shelf radio of the type configured to transmit and receive audio signals, e.g., as digital or analog modulated RF signals, to another communication system, which may be another two-way radio, a base station, or a communication network. The radio 130 includes an RF transceiver circuit coupled to an audio circuit which may include including an amplifier, microphone, audio speaker, volume control, and so forth. The transceiver circuit may include a manual and/or automatic frequency tuner for tuning the transceiver to a desired frequency channel. The radio 130 may include an integral push-to-talk button 132.

A headset 150 is associated with the two-way radio 130 and includes an audio speaker 152 and a microphone 154. The microphone may be positioned at the end of a boom 156 configured to position the microphone near the user's mouth and an ear hook 158 for securing the head set to the user's ear. Alternatively, the boom 156 could comprise an acoustic wave guide for transmitting audio waves to a microphone located elsewhere in the headset. In alternative embodiments, the ear hook 156 may be replaced with a head band for securing the headset over the user's head, ear loop, in-ear bud, and so forth. In other embodiments, the headset could be integrated with headgear worn by the user, such as a protective helmet. The headset 150 communicates with the radio 130 via a wireless protocol, such as Bluetooth, WiFi, ZigBee, or other RF protocol.

The communication system 100 further includes a wireless push-to-talk device 170 wirelessly coupled to the headset 150. The wireless PTT device 170 includes a remote control interface, for example, at least one push button 172 as shown in the illustrated embodiment. Multiple functions may be performed in the illustrated, single-button embodiment using multiple button press events or types, such as single tap, double tap, press and hold, etc. In the preferred embodiment, a single press of the button 172 cues the microphone 154 for PTT operation of the radio 130 and a double press of the cues the microphone 154 for receiving voice commands for controlling operation of the life support system 110. Alternatively, multiple functions may be accommodated by providing multiple buttons on the unit 170.

Predetermined voice commands are configured to control operation of the life support system 110 via an adapter interface 190 which is plugged into a data port 128 on the life support system 110. The adapter 190 is wirelessly coupled to the headset 150. The adapter 190 is coupled to the life support system 110 via a cable 192 which plugs into a complementary data port 194 on the life support system. Power to operate the adapter 190 may also be supplied by a power supply of the life support system via the cable connection 192.

The wireless adapter 190 includes an RF transceiver for receiving signals representative of voice commands for controlling operation of the life support system 110 and outputting signals representative of one or more voice alerts, warnings, or prompts, and/or transmitting data to the headset 150 for transmission to the radio 130 for transmission to a like radio system, base station, or over a communication network.

Exemplary voice commands include, for example, mode selection commands, data transmit commands, receive/display data, and life support system status data output commands, such as data representative of tank air pressure in a source of breathable gas. As shown in FIG. 4, the mode selection voice command allows the user to use a spoken command to switch the mode of operation of the life support system, e.g., to toggle between SCBA, PAPR, and APR modes. Send data voice commands allow the user to use a spoken command to trigger output of life support system data via the adapter 190, such as GPS positional data or vital sign data representative of one or more of the user's vital signs. The data is output to the headset 150, which, in turn, is transmitted the radio 130 for transmission to a communications system, which may be other like radio systems, a base station, or to a communication network using the transceiver circuitry of the radio 130.

Receive/Display Data commands may also be provided to cue the radio 130 to receive data from a team member employing a like system, such as team member GPS positional data or data representative of a team member's vital signs. Such data can be received using the transceiver circuitry of the radio 130 and retransmitted to the headset 150 for output as an audible signal via the speakers 154, and/or output to an associated human viewable display (not shown).

The adapter 190 is configured to output a signal representative of an audible alert to the headset 150 for audible output via the audio speaker 152. The alert signals may comprise prerecorded and stored digitized spoken word alerts, synthetic speech alerts, e.g., generated using a text-to-speech converter, and so forth. It will be recognized that some of the alerts or prompts may also be implemented as audible sounds representative of a given status or condition of the life support system 110.

The voice alerts may include an audible low pressure warning when the air pressure sensor 118 detects that the air pressure in the source of compressed breathing gas falls below some predetermined threshold value. Another alert includes a low battery warning, which is triggered when the low battery detector 120 determines that the battery level of the life support system power supply has fallen below some predetermined threshold.

Still another alert may be provided when the air quality monitor 116 detects a toxic constituent in the ambient air which cannot be filtered or removed using the filtration elements of the life support system 110. A mode selection readout alert outputs the selected mode of operation of the life support system, e.g., responsive to a change in the mode of operation. An audible air pressure alert may be provided based on a signal from the air pressure sensor 118 representative of the current pressure in the air supply 112, e.g., at periodic intervals during operation and/or responsive to a voice command.

Referring now to FIGS. 5-8, there appears a second exemplary communication system 200, wherein a push-to-talk system is incorporated with a weapon system 210. The weapon system 210 may be a weapon laser system include a range finding and/or pointing device 212, such as laser/optical range finder, targeting module providing one or more lasers for aiming and/or target designation, a combined laser range finder/designator, or the like. The range finder/designator device 212 is of a type intended to be mounted to a firearm 214 having a weapon rail interface 216, such as a MIL-STD-1913 accessory rail interface, RIS/RAS accessory rail interface, and STANAG-4694 accessory rail interface, among others. The rail interface 216 is preferably a powered rail having integrated electrical contacts and electrical conductors for routing power and/or data signals to various locations on the rail. Alternatively, a nonpowered rail interface is contemplated, wherein power and/or signals may be transmitted between devices on the rail via a cabled connection. A GPS receiver 224 may also be provided in the device 212 for determine the user's geographical position.

The weapon system 210 also includes a handgrip 220 adapted for attachment to the forearm portion of the firearm 214. The handgrip 220 may include one or more manually actuatable buttons or switches 222 for controlling operation of the device 212.

The communication system 200 further includes a two-way radio 130 and headset 150, which may be as described above. In the illustrated embodiment, the handgrip 220 is configured as a wireless push-to-talk device, and is wirelessly coupled to the headset 150. The one or more push buttons or switches 222 are configured to selectively cue the microphone 154 for PTT operation of the radio 130 and cues the microphone 154 for receiving voice commands for controlling operation of the range finder/designator 212.

Predetermined voice commands are configured to control operation of the device 212 via an adapter interface 190 which is plugged into a data port on the device 212. The adapter 190 is wirelessly coupled to the headset 150. The adapter 190 is coupled to the device 212 via a cable 192 which plugs into a complimentary data port 294 on the weapon system 212. Power to operate the adapter 190 may also be provided, via the cable connection 192, from a power supply within the device 212 or from a power supply or other powered device electrically coupled to the powered rail interface 216.

The wireless adapter 190 includes an RF transceiver for receiving signals representative of voice commands for controlling operation of the device 212 and outputting signals representative of one or more voice alerts, warnings or prompts, and/or transmitting data to the headset 150 for transmission to the radio 130 for further transmission to a like radio system, base station, or communication network.

Exemplary voice commands include, for example, range target commands, mode selection commands, data transmit commands, send current GPS location to team/home base, send range to target commands. As shown in FIG. 8, the range target command allows the user to use a spoken command to actuate a range finding function of the device 212.

A mode selection command allows the user to use a spoken command to switch the mode of operation of the device 212, e.g., to switch between a range finding function and a pointing or designator function, to switch between laser of different wavelength, e.g., between a visible pointing laser and an IR pointing laser, and so forth. A send GPS location command allows the user to use a spoken command to trigger output of the user's GPS coordinates from the GPS receiver 224 via the adapter 190. The data is output to the headset 150, which, in turn, is retransmitted to a communications system, which may be other like radio systems, a base station, or to a communication network using the transceiver circuitry of the radio 130.

A send range to target voice command allows the user to use a spoken command to trigger output of data representative of a calculated distance to a designated target as determined using a range finding function of the device 212, which data is output to the headset 150 which transmits the range to target data to the radio 130, which, in turn, transmits the data to a communications system, which may be other like radio systems, a base station, or a communication network, using the transceiver circuitry of the radio 130.

The adapter 190 is also configured to output a signal representative of audible prompts or alerts to the headset 150 for audible output via the audio speaker 152. The alert signals may comprise prerecorded and stored digitized spoken word alerts, synthetic speech alerts, e.g., generated using a text-to-speech converter, and so forth.

The voice alerts may include an audible, spoken word representation of a range to target as determined by a range finding function of the device 212. Another voice prompt may include a spoken word representation of the user's geographical position as determined by the GPS receiver 224. Another voice prompt may be a spoken word representation of a team member's geographical or GPS position transmitted by the team member to the user's radio 130 and output in audible form via the headset 150. Another voice prompt may include a spoken word indication of the currently selected mode of operation of the device 212. Yet another alert may include a low battery warning triggered when a low battery detector 226 determines that the battery level of the power supply providing power to the weapon system has fallen below some predetermined threshold.

Figure 7:
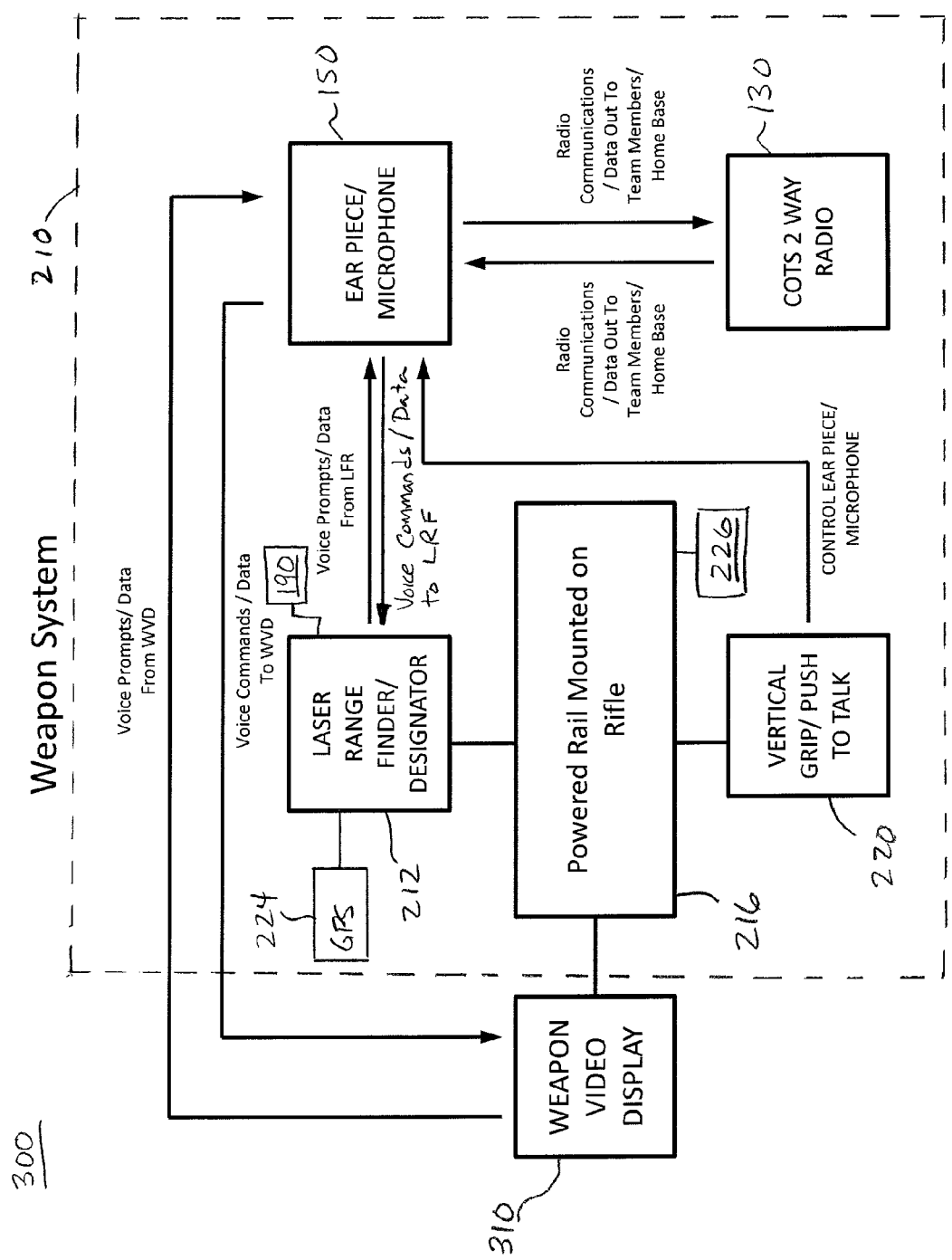
FIG. 7 is a functional block diagram of the system appearing in FIGS. 5 and 6.
Figure 9:
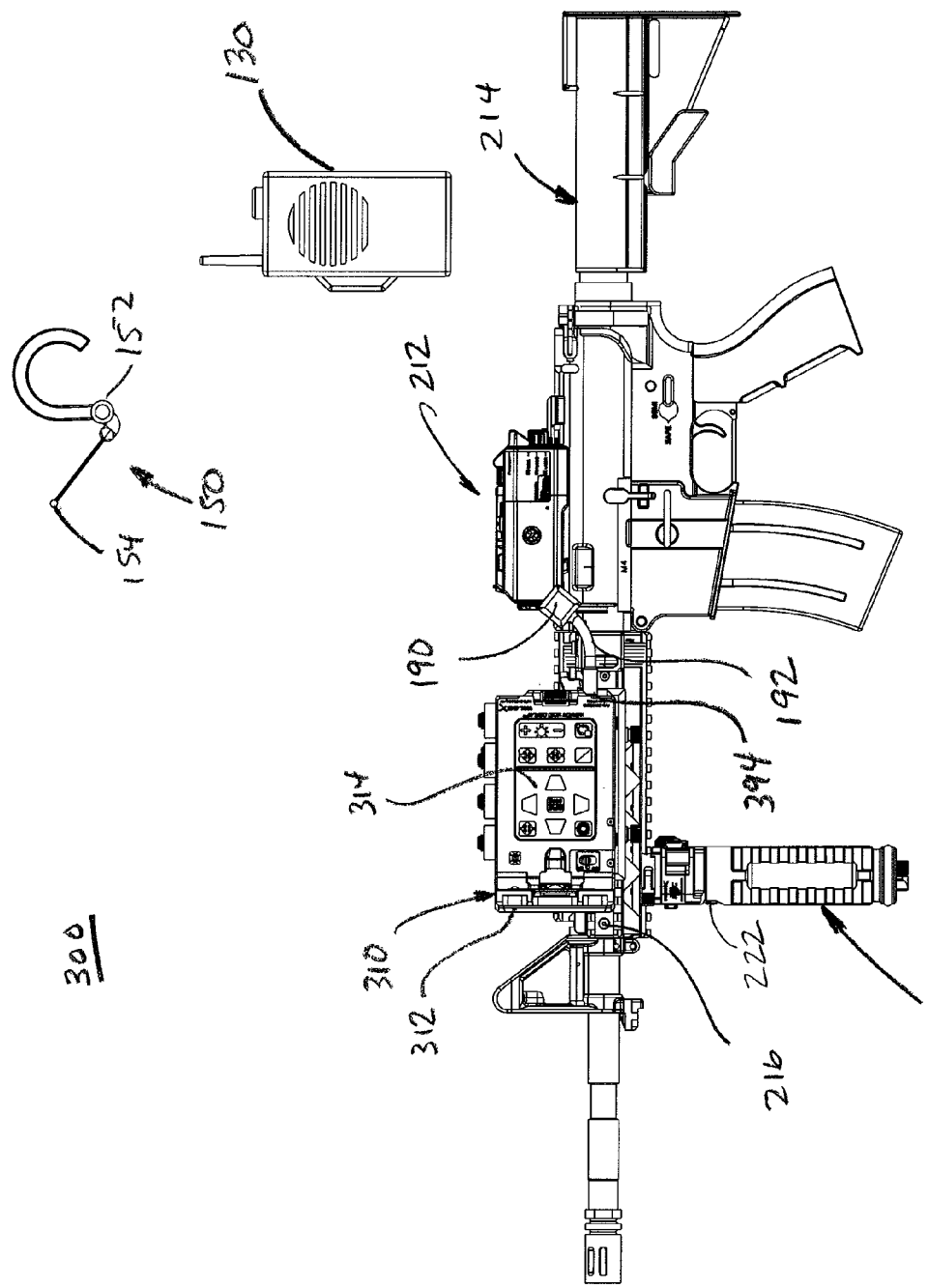
FIGS. 9 and 10 are exploded views of an exemplary push-to-talk system used in connection with a weapon video display system.
Figure 10:
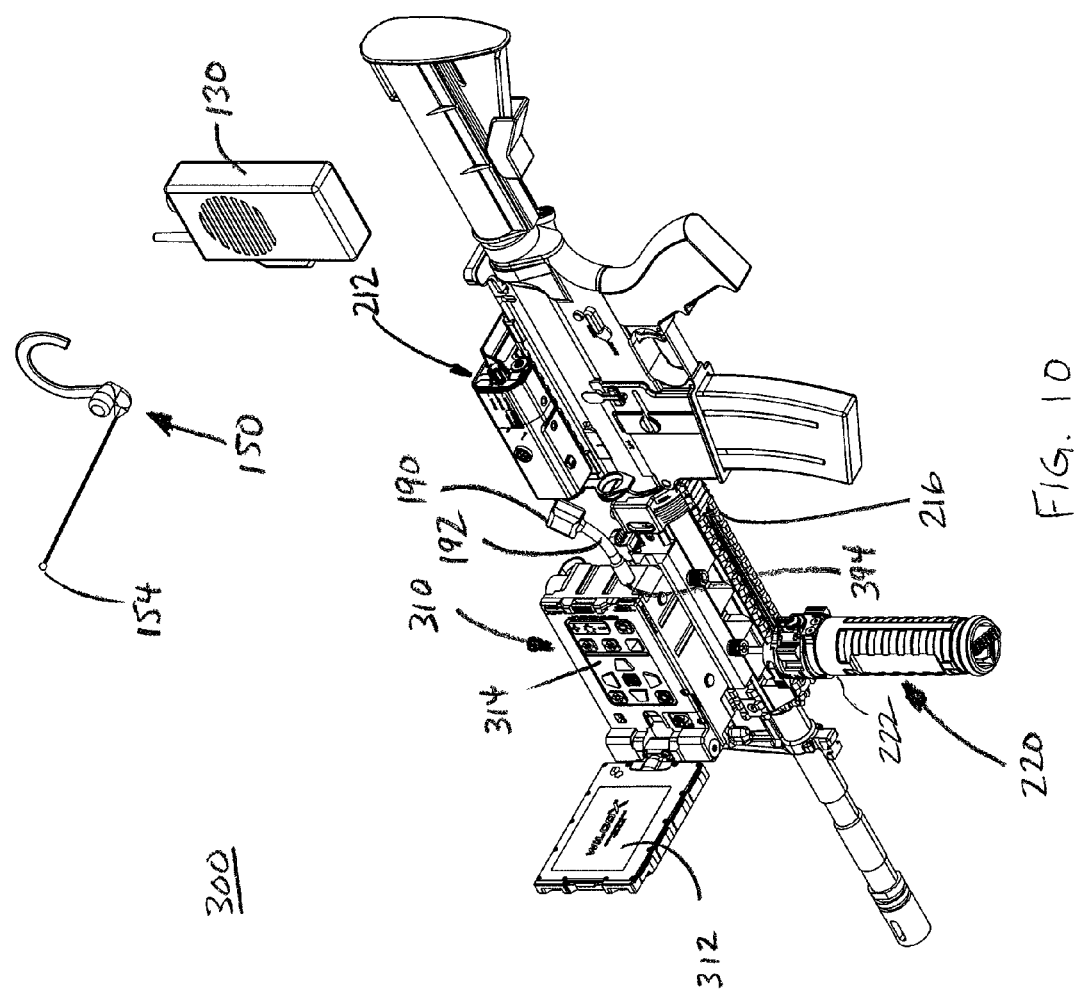

Referring now to FIGS. 9 and 10, and with continued reference to FIG. 7, there appears a third exemplary communication system 300, wherein a push-to-talk system is incorporated with a weapon video display system 310. The system 310 may optionally be used in conjunction with the range finder/designator device 212 and/or handgrip 220, the above description of which is applicable here.

The weapon video display system 310 may include a display screen 312, which, in turn, may include a touch screen overlay for providing input for controlling operation of the weapon video display 310. Alternatively or additionally, a keypad 314 comprising one or more push buttons or the like may be provided for controlling operation of the weapon video display 310.

The communication system 300 further includes a two-way radio 130 and headset 150, which may be as described above. In the illustrated embodiment, the handgrip 220 is configured as a wireless push-to-talk device, and is wirelessly coupled to the headset 150. The one or more push buttons or switches 222 are configured to selectively cue the microphone 154 for PTT operation of the radio 130 and cues the microphone 154 for receiving voice commands for controlling operation of the range finder/designator 212, as described above, and/or weapon video display system 310, as described below.

Predetermined voice commands are configured to control operation of the weapon video display system 310 via an adapter interface 190 which is plugged into a data port on the device 310. The adapter 190 is wirelessly coupled to the headset 150. The adapter 190 is coupled to the device 310 via a cable 192 which plugs into a complimentary data port 394 on the device 310. Power to operate the adapter 190 may also be provided, via the cable connection 192, from a power supply within the device 310 or from a power supply or other powered device electrically coupled to the powered rail interface 216.

The wireless adapter 190 includes an RF transceiver for receiving signals representative of voice commands for controlling operation of the video device 310 and outputting signals representative of one or more voice alerts, warnings or prompts. The wireless adapter 190 is also configured to transmit data to the headset 150 for further transmission via the radio 130 to a communication system, such as a like two-way radio system, a base station, or a communication network.

Exemplary voice commands may include the voice commands described above for the range finder/targeting device system 212 as described above. Exemplary voice commands may also include voice commands for controlling operation of the weapon video display system 310. For example, a mode selection command allows the user to use a spoken command to switch the mode of operation of the device 310, e.g., to switch between a video or camera display providing a video from an associated camera (not shown) and other graphical user interface mode provided by the device 310, e.g., an on-screen interface using menus and/or objects for controlling operation of attached devices. Where multiple cameras are provided, such as a daytime camera and a nighttime or low lux camera, a voice command may be provided for toggle between the multiple camera sources.

In certain embodiments, a targeting display mode may also be provided and selected via a voice command using the headset. For example, a ballistics computer function may be provided, e.g., using a processor in the range finder 212 or the weapon video display system 310, to provide an on screen reticle on the display screen 312 using range information and, optionally, other ballistics factors to assist the user in aligning the weapon to cause a fired projectile to hit a desired spot.

Send GPS location and send range to target commands may also be provided as described above. In certain embodiments, a send data voice command may be provided to transmit still image data and/or video data acquired by a camera associated with the weapon video display to the two-way radio via the headset for transmission over a communication network.

The adapter 190 is also configured to output signals representative of audible prompts or alerts to the headset 150 for audible output via the audio speaker 152. The alert signals may comprise prerecorded and stored digitized spoken word alerts, synthetic speech alerts, e.g., generated using a text-to-speech converter, and so forth.

The voice alerts may include an audible, spoken word representation of a range to target as determined by a range finding function of the device 212. Another voice prompt may include a spoken word representation of the user's geographical position as determined by the GPS receiver 224. Another voice prompt is a spoken word representation of a team member's geographical position transmitted by the team member to the user's radio 130 and output via the headset 150. Another voice prompt includes a spoken word indication of the currently selected mode of operation of the device 212. Yet another alert includes a low battery warning triggered when the low battery detector 226 determines that the battery level of the power supply providing power to the weapon video display has fallen below some predetermined threshold.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A communication system, comprising:
   an information handling system;
   a headset including a microphone and an audio speaker installed on the headset, the headset including an RF transceiver configured to perform wireless communication with a two-way radio having a push-to-talk communication channel, the RF transceiver further configured to perform wireless communication with the information handling system;
   said headset including processing electronics configured to process an input signal from the microphone and output a first processed signal to the RF transceiver and to process an input signal from the RF transceiver and output a second processed signal to the speaker; and
   a remote control unit configured to perform wireless communication with the headset, the remote control unit including a remote control unit interface disposed thereon for selectively configuring the headset to function as an audio interface for the push-to-talk communication channel and an audio interface for the information handling system;
   wherein the information handling system is a life support system and the interface is configured to activate the microphone for transmitting an audio signal over the push-to-talk channel responsive to a first button press event, the interface further configured to activate the microphone for transmitting one or more voice commands to the information handling system, the one or more voice commands selected from the group consisting of one or more breathing gas mode selection commands, one or more data transmit commands, one or more data receive commands, and one or more data display commands, and any combination thereof, wherein the one or more breathing gas mode selection commands are operable to select a source of breathable gas delivered by the life support system.

2. The communication system of claim 1, wherein the two-way radio is a portable, commercial, off-the-shelf radio.

3. The communication system of claim 1, wherein the remote control unit interface includes one or more push buttons.

4. The communication system of claim 1, further comprising:
   an adapter including a connector configured to couple the adaptor to the information handling system and a transceiver configured to perform two-way wireless communication with the headset.

5. The communication system of claim 1, wherein the remote control unit interface includes a push button configured to activate the microphone for transmitting an audio signal over the push-to-talk channel responsive to a first button press event, the push button further configured to activate the microphone for transmitting one or more voice commands to the information handling system responsive to a second button press event.

6. The communication system of claim 1, further comprising the two-way radio.

7. The communication system of claim 1, wherein the one or more data transmit commands are operable to cause the life support system to transmit data representative of one or more of a user's location and one or more vital signs of the user to the two-way radio via the headset for transmission over a communication network.

8. The communication system of claim 1, wherein the one or more data receive commands are operable to cause the life support system to receive data representative of one or more of: the location of a team member located remotely with respect to a user and one or more vital signs of the team member located remotely with respect to the user from the two-way radio via the headset.

9. The communication system of claim 1, wherein the one or more data display commands are operable to cause the life support system to display on a human viewable display associated with the life support system data representative of one or more of an air pressure of a source of breathing gas connected to the life support system, the location of a team member located remotely with respect to a user, and one or more vital signs of the team member located remotely with respect to the user.

10. A communication system, comprising:
    an information handling system;
    a headset including a microphone and an audio speaker installed on the headset, the headset including an RF transceiver configured to perform wireless communication with a two-way radio having a push-to-talk communication channel, the RF transceiver further configured to perform wireless communication with the information handling system;
    said headset including processing electronics configured to process an input signal from the microphone and output a first processed signal to the RF transceiver and to process an input signal from the RF transceiver and output a second processed signal to the speaker; and
    a remote control unit configured to perform wireless communication with the headset, the remote control unit including a remote control unit interface disposed thereon for selectively configuring the headset to function as an audio interface for the push-to-talk communication channel and an audio interface for the information handling system;

wherein the information handling system is a weapon laser system and wherein the interface is configured to activate the microphone for transmitting an audio signal over the push-to-talk channel responsive to a first button press event, the interface further configured to activate the microphone for transmitting one or more voice commands to the information handling system responsive to a second button press event, the one or more voice commands selected from the group consisting of a range target command, a mode selection command, one or more data transmit commands, and any combination thereof.

11. The communication system of claim 10, further comprising:
an adapter providing a wireless interface between the weapon laser system and the headset.

12. The communication system of claim 11, wherein the remote control unit is a handgrip configured to be removably attached to a fore end portion of a weapon and the remote control unit interface is a push button disposed on the handgrip.

13. The communication system of claim 10, wherein the mode selection command is operable to select between a laser range finder mode of operation and a laser designator mode of operation.

14. The communication system of claim 10, wherein the one or more data transmit commands are operable to cause the weapon laser system to transmit data representative of one or more of a user location information and target range information to the two-way radio via the headset for transmission over a communication network.

15. The communication system of claim 11, further comprising:
the adapter including a connector configured to couple the adaptor to the information handling system and a transceiver configured to perform wireless communication with the headset.

16. The communication system of claim 10, further comprising the two-way radio.

17. The communication system of claim 10, wherein the remote control unit interface includes a push button configured to activate the microphone for transmitting an audio signal over the push-to-talk channel responsive to the first button press event, the push button further configured to activate the microphone for transmitting one or more voice commands to the information handling system responsive to the second button press event.

\* \* \* \* \*